United States Patent
Park et al.

(10) Patent No.: US 12,265,912 B2
(45) Date of Patent: Apr. 1, 2025

(54) DEEP NEURAL NETWORK TRAINING ACCELERATOR AND OPERATION METHOD THEREOF

(71) Applicant: Korea University Research and Business Foundation, Seoul (KR)

(72) Inventors: Jong Sun Park, Seoul (KR); Dong Yeob Shin, Seoul (KR); Geon Ho Kim, Gunpo-si (KR); Joong Ho Jo, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 1049 days.

(21) Appl. No.: 17/151,966

(22) Filed: Jan. 19, 2021

(65) Prior Publication Data

US 2022/0019897 A1 Jan. 20, 2022

(30) Foreign Application Priority Data

Jul. 17, 2020 (KR) .................. 10-2020-0089210

(51) Int. Cl.
*G06N 3/084* (2023.01)
*G06F 9/50* (2006.01)
*G06F 18/214* (2023.01)
*G06N 3/063* (2023.01)

(52) U.S. Cl.
CPC .......... *G06N 3/084* (2013.01); *G06F 9/5027* (2013.01); *G06F 18/2148* (2023.01); *G06N 3/063* (2013.01)

(58) Field of Classification Search
None
See application file for complete search history.

(56) References Cited

U.S. PATENT DOCUMENTS

| | | | |
|---|---|---|---|
| 8,706,798 B1 | 4/2014 | Suchter et al. | |
| 9,547,818 B2* | 1/2017 | Osogami | G06N 3/08 |
| 10,423,861 B2* | 9/2019 | Gao | G16B 20/00 |
| 10,699,189 B2* | 6/2020 | Lie | G06N 3/084 |
| 11,062,202 B2* | 7/2021 | James | G06N 3/063 |
| 11,544,545 B2* | 1/2023 | Baum | G06N 3/063 |
| 2017/0357896 A1* | 12/2017 | Tsatsin | G06N 3/045 |
| 2018/0314941 A1* | 11/2018 | Lie | G06F 9/45533 |
| 2019/0049231 A1* | 2/2019 | Choi | G01B 7/004 |

(Continued)

FOREIGN PATENT DOCUMENTS

| | | |
|---|---|---|
| KR | 10-1987475 B1 | 6/2019 |
| KR | 10-2034659 B1 | 10/2019 |

(Continued)

OTHER PUBLICATIONS

Master et al. "Revisting Small Batch Training For Deeep Neural Networks," Graphcore Research Bistrol, UK, pp. 1-18, 2018.*

(Continued)

*Primary Examiner* — Maikhanh Nguyen
(74) *Attorney, Agent, or Firm* — NSIP Law (57) ABSTRACT

A deep neural network training accelerator includes an operational unit sequentially performing first and second operations on a plurality of input data of a sub-set according to a mini-batch gradient descent, a determination unit determining each of the input data as one of skip data and training data based on a confidence matrix obtained by the first operation, and a control unit controlling the operational unit to skip the second operation with respect to the skip data.

15 Claims, 7 Drawing Sheets

(56) References Cited

U.S. PATENT DOCUMENTS

| | | |
|---|---|---|
| 2019/0205740 A1 | 7/2019 | Judd et al. |
| 2019/0244083 A1* | 8/2019 | Franca-Neto .......... G06N 3/063 |
| 2021/0142155 A1* | 5/2021 | James ................... G06N 3/045 |
| 2021/0142167 A1* | 5/2021 | Lie .......................... G06N 3/10 |

FOREIGN PATENT DOCUMENTS

| | | |
|---|---|---|
| KR | 10-2020-0071865 A | 6/2020 |
| KR | 10-2020-0076800 A | 6/2020 |

OTHER PUBLICATIONS

Shrestha et al. "Review of Deep Learning Algorithms and Architectures," in IEEE Access, vol. 7, pp. 53040-53065, 2019.*

Rojas, Raul, and Raúl Rojas "The backpropagation algorithm", Neural networks: a systematic introduction, 1996, pp. 149-182.*

Bendelac, Shiri. "Enhanced Neural Network Training Using Selective Backpropagation and Forward Propagation" Diss. Virginia Tech, 2018, (97 pages in English).

Jiang, Angela H., et al. "Accelerating Deep Learning by Focusing on the Biggest Losers." arXiv preprint arXiv:1910.00762, 2019, (14 pages in English).

* cited by examiner

DEEP NEURAL NETWORK TRAINING ACCELERATOR AND OPERATION METHOD THEREOF

CROSS-REFERENCE TO RELATED APPLICATION

This U.S. non-provisional patent application claims priority under 35 U.S.C. § 119 of Korean Patent Application No. 10-2020-0089210, filed on Jul. 17, 2020, the contents of which are hereby incorporated by reference in its entirety.

BACKGROUND

1. Field of Disclosure

The present disclosure relates to a deep neural network training accelerator and an operation method of the deep neural network training accelerator. More particularly, the present disclosure relates to a deep neural network training accelerator based on a prediction reliability according to a mini-batch gradient descent and an operation method of the deep neural network training accelerator.

2. Description of the Related Art

A deep neural network (DNN) provides state-of-the-art performance in many fields, such as an image recognition/classification, an object detection, or the like, based on many parameters and computational quantities.

However, since the DNN requires a large quantity of computation to train numerous parameters, it takes a long time such as a day or a week to train the DNN. Accordingly, in order to decrease the time and energy consumed to train the DNN, it is effective to reduce the quantity of computation itself required to train the DNN.

In general, the DNN is trained based on a mini-batch gradient descent. As noise is essentially accompanied with the mini-batch gradient descent, it is possible to approximate the computation required for the training instead of precisely calculating.

However, the DNN training based on the mini-batch gradient descent also needs a long training time and lots of training energy. Thus, there is a need for a way to distinguish between operations that are important for the training and operations that are not important for the training and to apply effective approximations to relatively less important operations.

SUMMARY

The present disclosure provides a deep neural network training accelerator capable of increasing its training speed and reducing its training energy.

The present disclosure provides an operation method of the deep neural network training accelerator.

Embodiments of the inventive concept provide a deep neural network training accelerator including an operational unit sequentially performing first and second operations on a plurality of input data of a sub-set according to a mini-batch gradient descent, a determination unit determining each of the input data as one of skip data and training data based on a confidence matrix obtained by the first operation, and a control unit controlling the operational unit to skip the second operation with respect to the skip data.

The operational unit performs the second operation with respect to the training data after a predetermined time lapses from a time point at which the first operation is performed.

The first operation is a first training stage of the mini-batch gradient descent, which uses a forward propagation algorithm.

The second operation is a second training stage of the mini-batch gradient descent, which sequentially uses a backward propagation algorithm and a weight update algorithm.

The determination unit is implemented as a comparator that compares a largest element of the confidence matrix with a predetermined threshold value.

The comparator outputs a low signal corresponding to the skip data to the control unit when a value of the largest element is equal to or greater than the predetermined threshold value.

The comparator outputs a high signal corresponding to the training data to the control unit when a value of the largest element is smaller than the predetermined threshold value.

The control unit parallelizes the second operation with respect to the training data in response to the low signal.

The number of the low signals is inversely proportional to an operation time of the second operation.

The deep neural network training accelerator further includes an input unit assigning each of the input data arbitrarily selected from total input data to the operational unit and an output unit summing each variation in weight output through the operational unit to output a variation in output weight corresponding to a gradient of the sub-set.

The operational unit has a systolic array structure and includes a plurality of operational devices that sequentially performs the first and second operations.

The operational unit initializes any one operational device corresponding to the skip data among the operational devices in response to a parallelization control signal applied thereto from the control unit.

The operational unit reassigns a portion of the training data assigned to the other operational devices among the operational devices to the any one operational device.

The control unit reassigns a plurality of sub-data divided from each of the training data to the operational devices according to a data flow.

The data flow refers to a data movement path for reading and storing data.

Embodiments of the inventive concept provide a method of operating a deep neural network training accelerator. The method includes allowing an operational unit to perform a first operation on a plurality of input data of a sub-set according to a mini-batch gradient descent, allowing a determination unit to determine the input data as one of skip data and training data based on a confidence matrix obtained by the first operation, allowing a control unit to output a parallelization control signal to skip a second operation with respect to the skip data in response to the skip data, and allowing the operational device to skip the second operation with respect to the skip data and to perform the second operation on the training data based on the parallelization control signal.

The first operation is a first training stage of the mini-batch gradient descent, which uses a forward propagation algorithm.

The second operation is a second training stage of the mini-batch gradient descent, which sequentially uses a backward propagation algorithm and a weight update algorithm.

The determination unit is implemented as a comparator that compares a largest element of the confidence matrix with a predetermined threshold value.

The performing of the second operation includes allowing the operational unit to initialize any one operational device corresponding to the skip data among a plurality of operational devices in response to the parallelization control signal, allowing the operational unit to reassign a portion of each of the training data assigned to the other operational devices to the any one operational device, and allowing the operational unit to process the second operation with respect to the training data in parallel using the operational devices after a predetermined time lapses from a time point at which the first operation is performed.

According to the above, a total amount of training operation to output a variation in weight is significantly reduced, and thus, energy consumption also decreases.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Hereinafter, embodiments of the present disclosure be described with reference to specific embodiments and the accompanying drawings. However, the embodiments of the present disclosure may be modified in various other forms, and the scope of the present disclosure is not limited to the embodiments described below. In addition, embodiments of the present disclosure are provided to more fully describe the present disclosure to those skilled in the art. Accordingly, the shape and size of elements in the drawings may be exaggerated for a clearer description, and elements indicated by the same reference numerals in the drawings are the same elements.

In addition, in order to clearly describe the present disclosure in the drawings, parts irrelevant to the description are omitted, and thicknesses are enlarged to clearly express various layers and regions, and components having the same function within the scope of the same idea have the same reference. Further, throughout the specification, when a part "includes" a certain component, it means that the component may further include other components, not to exclude other components, unless otherwise stated.

Figure 1:
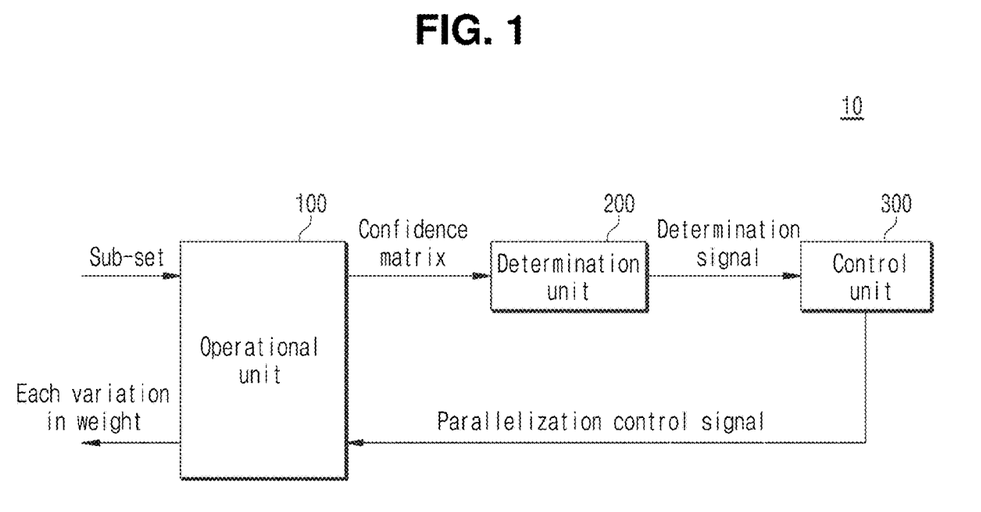
FIG. 1 is a block diagram showing a deep neural network training accelerator according to an exemplary embodiment of the present disclosure.
Figure 2:
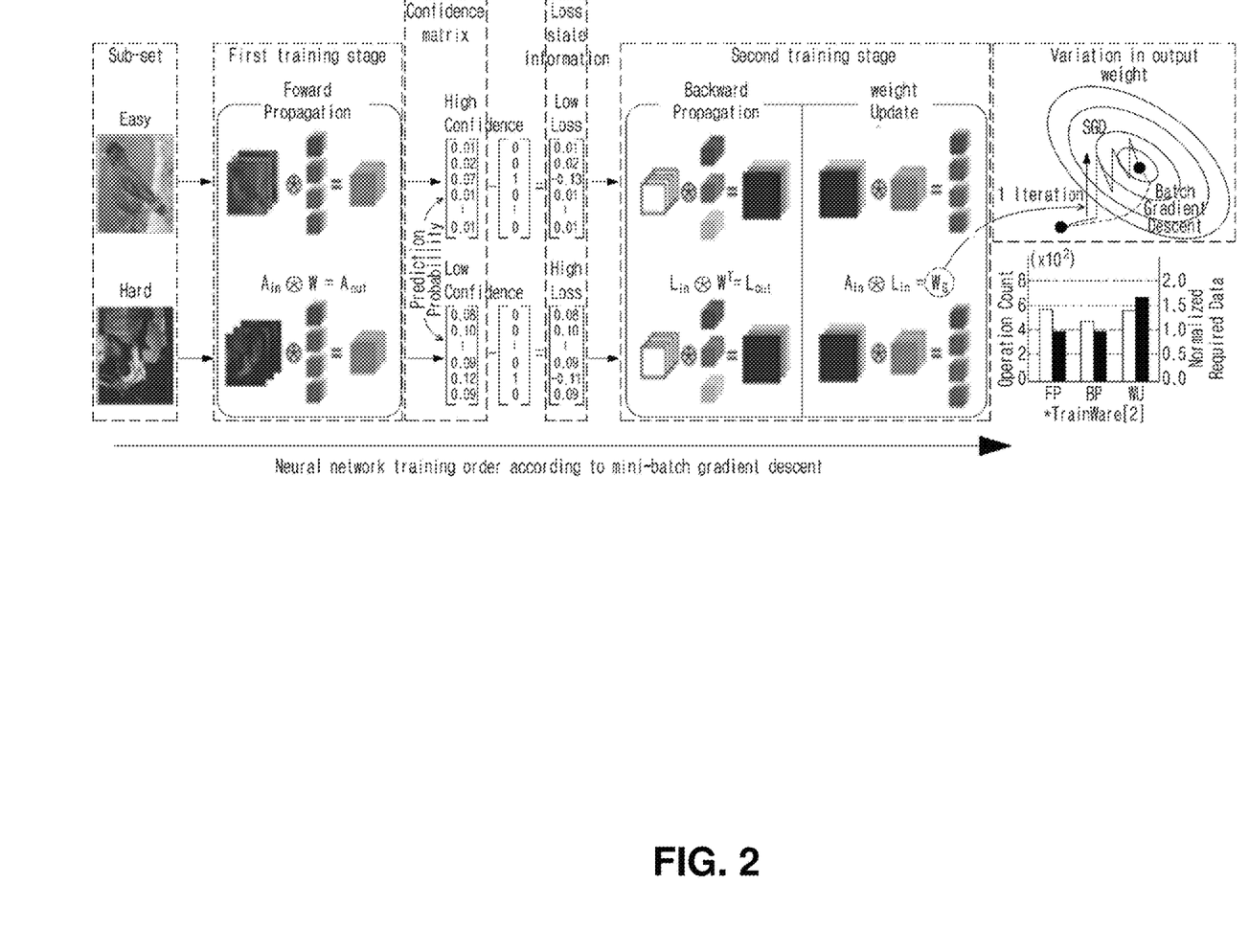
FIG. 2 is a view showing a mini-batch gradient descent.

FIG. 1 is a block diagram showing a deep neural network training accelerator 10 according to an exemplary embodiment of the present disclosure, and FIG. 2 is a view showing a mini-batch gradient descent.

Referring to FIGS. 1 and 2, the deep neural network training accelerator 10 may include an operational unit 100, a determination unit 200, and a control unit 300.

The operational unit 100 may sequentially perform first and second operations on a plurality of input data of a sub-set according to the mini-batch gradient descent (MGD).

In this case, the sub-set may include the input data arbitrarily selected from total input data. For example, the input data may include one of data to classify or detect images, data to determine medical information, data for an autonomous driving, and data for security and system management.

As shown in FIG. 2, the mini-batch gradient descent (MGD) may be a set of neural network training schedule that sequentially performs the first and second operations to train a variation in weight with respect to each input data of the sub-set. In this case, a sum of the variation in weight of the each input data may be a variation in output weight of the sub-set.

The mini-batch gradient descent (MGD) may include a training method that sequentially uses a forward propagation algorithm (FP), a backward propagation algorithm (BP), and a weight update algorithm (WU).

In this case, the first operation may be a first training stage of the mini-batch gradient descent (MGD) that uses the forward propagation algorithm FP, and the second operation may be a second training stage of the mini-batch gradient descent (MGD) that uses the backward propagation algorithm BP and the weight update algorithm WU. That is, the second operation may be performed after a predetermined time lapses from a time point at which the first operation is performed.

Then, the determination unit 200 may determine each of the input data as one of skip data and training data based on a confidence matrix obtained by the first operation.

As shown in FIG. 2, a largest element of the confidence matrix may determine a loss state corresponding to a training contribution.

For example, as shown in FIG. 2, when the largest element of the confidence matrix is equal to or greater than a predetermined threshold value, the confidence matrix may determine a low loss state corresponding to a low training contribution. In addition, when the largest element of the confidence matrix is smaller than the predetermined threshold value, the confidence matrix may determine a high loss state corresponding to a high training contribution.

Figure 3:
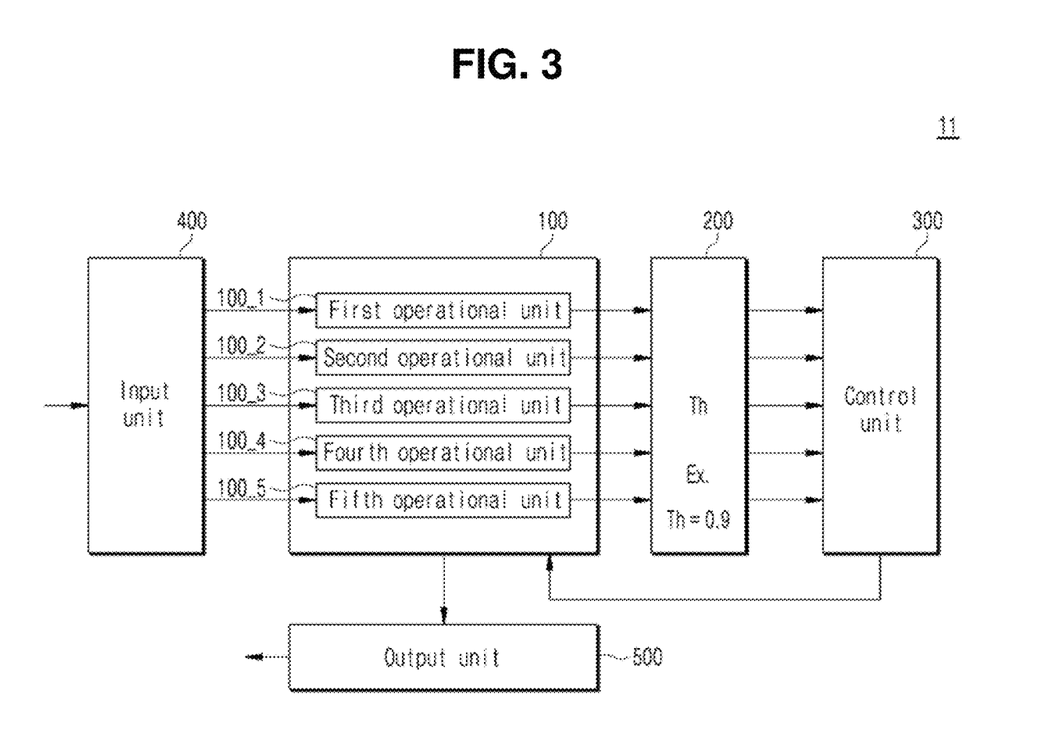
FIG. 3 is a block diagram showing an example of the deep neural network training accelerator of FIG. 1.

The determination unit 200 according to the exemplary embodiment may be implemented as a comparator that compares the largest element among elements of the confidence matrix with the predetermined threshold value. For example, as shown in FIG. 3, the threshold value of the comparator may be previously set to a value of about 0.9.

The comparator may output a determination signal, which determines the input data as one of the skip data and the training data, to the control unit 300 based on the compared result. In the present exemplary embodiment, the determination signal may include one low signal and one high signal.

In detail, when the largest element among the factors of the confidence matrix is smaller than the predetermined threshold value, the determination unit 200 may output the high signal that determines the input data corresponding to the confidence matrix as the training data. In addition, when the largest element among the elements of the confidence matrix is equal to or greater than the predetermined threshold value, the determination unit 200 may output the low signal that determines the input data corresponding to the confidence matrix as the skip data.

Then, the control unit 300 may control the operational unit 100 to skip the second operation with respect to the skip data based on the determination signal determined by the determination unit 200.

In detail, the control unit 300 may receive the low signal corresponding to the skip data determined by the determination unit 200. In this case, the control unit 300 may output a parallelization control signal to the operational unit 100 in response to the low signal to skip the second operation with respect to the corresponding skip data, and thus, the second operation of the operational unit 100 may be controlled. Accordingly, the operational unit 100 may skip the second operation with respect to the skip data based on the parallelization control signal.

In addition, the control unit 300 may parallelize the second operation with respect to at least one training data in response to the low signal.

In detail, the control unit 300 may reassign a portion of each of the at least one training data to an operational device to which the skip data are assigned, and thus, may parallelize the second operation for the at least one training data.

For example, the control unit 300 may divide the at least one training data into a plurality of first sub-data and a plurality of second sub-data and may reassign one of the first and second sub-data to the operational device to which the skip data are assigned.

In this case, the number of the low signals may be inversely proportional to an operation time of the second operation. For example, as the number of the low signals increases, the operation time of the second operation by the operational unit 100 may decrease. In addition, as the number of the low signals decreases, the operation time of the second operation by the operational unit 100 may increase.

According to the exemplary embodiment, when the number of the low signals is smaller than the number of the high signals, the control unit 300 may reassign the portion of the training data to the operational device to which the skip data are assigned in order of the largest data size.

The deep neural network training accelerator 10 according to the exemplary embodiment of the present disclosure may identify the input data as one of the skip data and the training data using the determination unit 200 based on the confidence matrix, and thus, may determine the training contribution of each of the input data. In this case, the deep neural network training accelerator 10 may skip the second operation of the operational unit 100 with respect to the skip data using the control unit 100, and thus, may significantly reduce a training operation amount required to output the variation in output weight.

Figure 4:
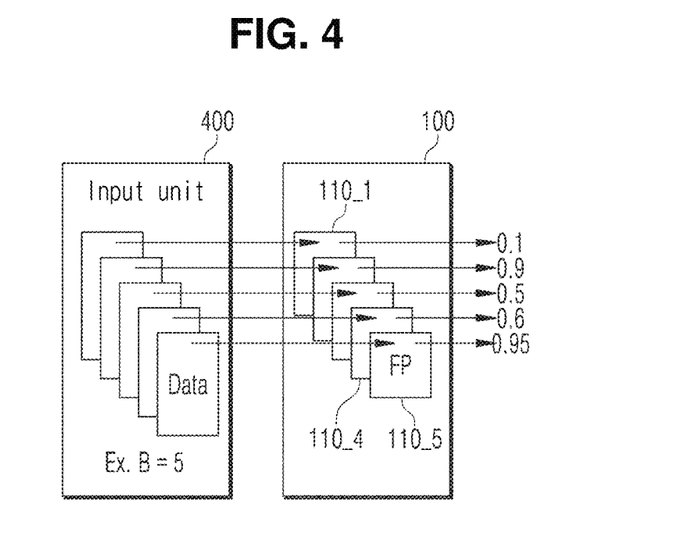
FIG. 4 is a view showing a first operation performed by an operational unit of FIG. 3.
Figure 5:
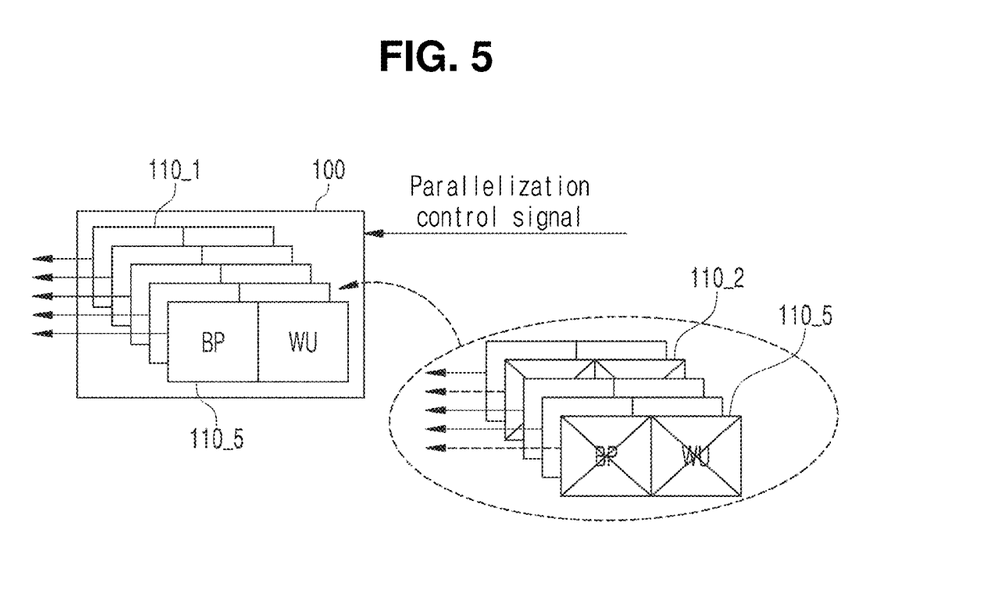
FIG. 5 is a view showing a second operation performed by an operational unit of FIG. 3.

FIG. 3 is a block diagram showing an embodiment of the deep neural network training accelerator 11 of FIG. 1, FIG. 4 is a view showing the first operation performed by the operational unit 100 of FIG. 3, and FIG. 5 is a view showing the second operation performed by the operational unit 100 of FIG. 3.

Referring to FIGS. 1 to 5, the deep neural network training accelerator 11 may include the operational unit 100, the determination unit 200, the control unit 300, an input unit 400, and an output unit 500. Hereinafter, in FIGS. 3 to 5, the same reference numerals denote the same elements in FIGS. 1 and 2, and thus, repetitive descriptions of the operational unit 100, the determination unit 200, and the control unit 300 will be omitted.

The input unit 400 may individually assign each of the input data of the sub-set arbitrarily selected from the total input data to the operational device. In this case, the number of the input data may correspond to the number of the operational devices in a one-to-one correspondence.

In detail, the input unit 400 may receive the total input data and may individually output the input data of the sub-set arbitrarily selected from the total input data to the operational device of the operational unit 100 according to the mini-batch gradient descent (MGD). That is, each operational device may be assigned with different input data from each other.

Then, the operational unit 100 may include, for example, a plurality of operational devices 110_1 to 110_5.

The operational devices 110_1 to 110_5 according to the exemplary embodiment may have a systolic array structure and may sequentially perform the first and second operations. In this case, each of the operational devices 110_1 to 110_5 may be implemented with memory-in-computing.

In detail, the operational devices 110_1 to 110_5 may perform the first operation on the input data assigned through the input unit 400. That is, the operational devices 110_1 to 110_5 may simultaneously perform distributed processing of the first operation on the input data by using a forward propagation algorithm FP.

For example, the forward propagation algorithm FP may correspond to the following Equation 1 of $A_{in} \circledast W = A_{out}$. In Equation 1, $A_{in}$ denotes an activation input of the forward propagation algorithm, W denotes a weight, and $A_{out}$ denotes an activation output.

As shown in FIG. 4, the operational devices 110_1 to 110_5 may output the loss state based on a plurality of confidence matrices obtained by performing the first operation.

In addition, as shown in FIG. 5, the operational devices 110_1 to 110_5 may perform the second operation on the input data after a predetermined time lapses from a time point at which the first operation is performed. That is, the operational devices 110_1 to 110_5 may simultaneously perform distributed processing of the second operation using the backward propagation algorithm BP and the weight update algorithm WU.

For example, the backward propagation algorithm BP may correspond to the following Equation 2 of $L_{in} \circledast W^T = L_{out}$. In Equation 2, $L_{in}$ denotes the loss input, $W^T$ denotes a transposed weight, and $L_{out}$ denotes the loss output.

In addition, the weight update algorithm WU may correspond to the following Equation 3 of $A_{in} \circledast L_{in} = W_G$. In Equation 3, $A_{in}$ denotes the activation input in the forward propagation, $L_{in}$ denotes the loss input, and $W_G$ denotes the variation in weight.

According to the exemplary embodiment, the operational unit 100 may initialize any one operational device (e.g., 110_2 and 110_5), which corresponds to the skip data, of the operational devices 110_1 to 110_5 in response to the parallelization control signal.

In this case, the operational unit 100 may reassign the portion of the training data assigned to the other operational devices 110_1, 110_3, and 110_5 to the any one operational device (e.g., 110_2 and 110_5).

Then, the operational unit 100 may process the second operation with respect to the training data in parallel through the operational devices 110_1 to 110_5 after the predetermined time lapses from a time point at which the first operation is performed, and thus, the operation speed may increase. In this case, the any one operational device (e.g., 110_2 and 110_5) may correspond to the parallelized data, which are the portion of the training data, in a one-to-one correspondence in number.

According to the exemplary embodiment, the control unit 300 may reassign the sub-data divided from each of the training data to the operational devices 110_1 to 110_5 according to a data flow. In the present exemplary embodiment, the data flow may refer to a data movement path for reading and storing data.

That is, as the control unit 300 may reassign each of the training data to the operational devices 110_1 to 110_5, the control unit 300 may perform the distributed processing of the second operation on the training data.

Then, the output unit 500 may output the variation in output weight that means a gradient of the sub-set based on each variation in weight output through the operational unit 100. In this case, the variation in output weight may be a sum of each variation in weight.

Figure 6:
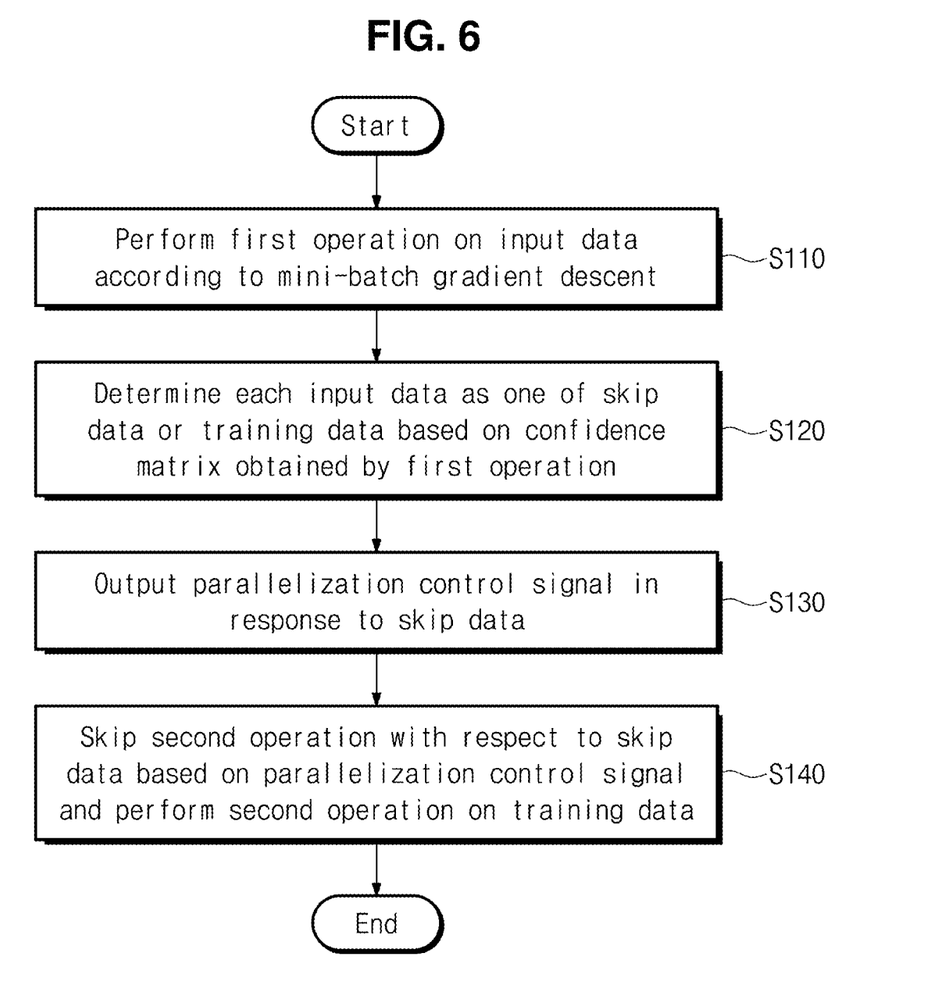
FIG. 6 is a flowchart showing an operation performed by the deep neural network training accelerator of FIG. 1.

FIG. 6 is a flowchart showing an operation performed by the deep neural network training accelerator 10 of FIG. 1.

Referring to FIGS. 1 and 6, the operational unit 100 may perform the first operation on the input data of the sub-set according to the mini-batch gradient descent (S110).

Then, the determination unit 200 may determine each of the input data as one of the skip data and the training data based on the confidence matrix obtained by performing the first operation (S120).

Next, the control unit 300 may output the parallelization control signal to the operational unit 100 in response to the skip data determined by the determination unit 200 (S130).

Then, the operational unit 100 may skip the second operation with respect to the skip data and may perform the second operation on the training data based on the parallelization control signal (S140).

Figure 7:
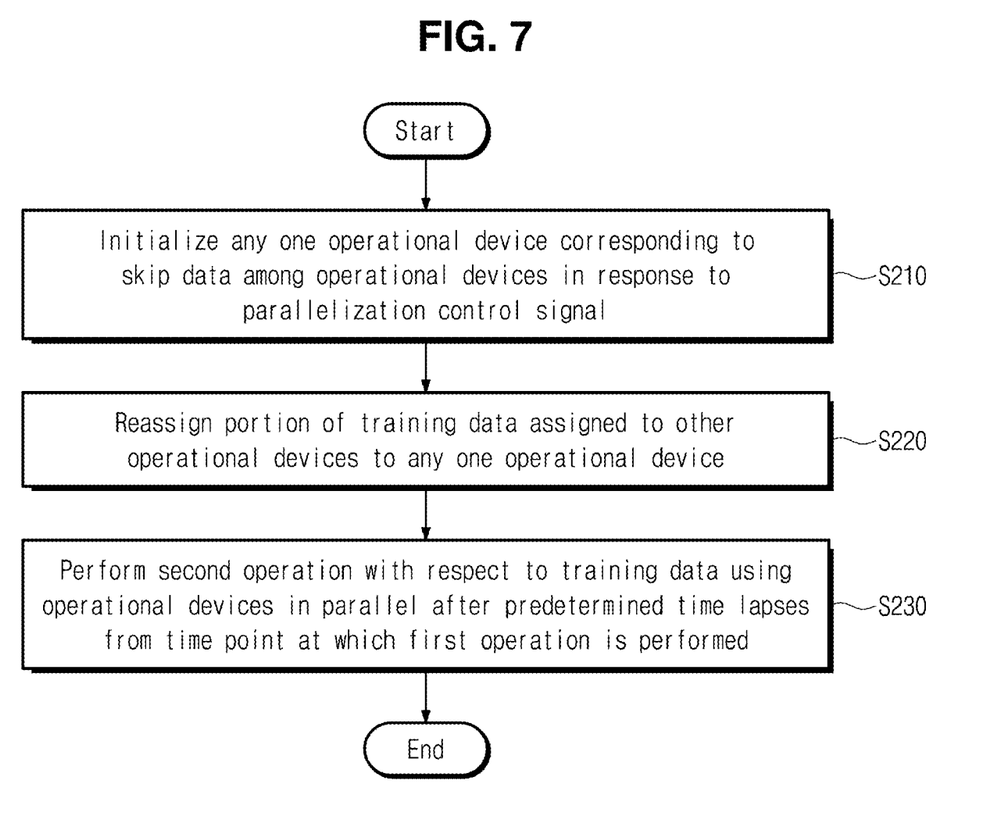
FIG. 7 is a flowchart showing a second operation performed by an operational unit of FIG. 5.

FIG. 7 is a flowchart showing the second operation performed by the operational unit 100 of FIG. 5.

Referring to FIGS. 5 and 7, the operational unit 100 may initialize the any one operational device (e.g., 110_2 and 110_5), which corresponds to the skip data, of the operational devices 110_1 to 110_5 based on the parallelization control signal (S210).

In this case, the operational unit 100 may assign the portion of the training data assigned to the other operational devices 110_1, 110_3, and 110_5 to the any one operational device (e.g., 110_2 and 110_5) (S220).

Then, the operational unit 100 may process the second operation with respect to the training data in parallel by using the operational devices 110_1 to 110_5 after the predetermined time lapses from the time point at which the first operation is performed (S230).

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. A deep neural network training accelerator implemented in hardware and configured to increase learning speed and reduce learning energy, the deep neural network training accelerator comprising:
an operational unit, executed by the deep neural network training accelerator, to sequentially perform first and second operations on a plurality of input data of a sub-set according to a mini-batch gradient descent;
a determination unit, executed by the deep neural network training accelerator, to determine each of the plurality of input data as one of skip data and training data based on a confidence matrix obtained by the first operation; and
a control unit, executed by the deep neural network training accelerator, to control the operational unit to skip the second operation with respect to the skip data,
wherein the determination unit comprises a comparator, the comparator executed by the deep neural network training accelerator to:
compare a largest element among elements of the confidence matrix with a predetermined threshold,
output a low signal corresponding to the skip data to the control unit when a value of the largest element is equal to or greater than the predetermined threshold, and
output a high signal corresponding to the training data to the control unit when a value of the largest element is smaller than the predetermined threshold, and
wherein the control unit, executed by the deep neural network training accelerator, to output a parallelization control signal to the operation unit in response to the low signal being received to control the operation unit to skip the second operation on the skip data and perform the second operation on the training data based on the parallelization control signal,
wherein the performing of the second operation comprises:
initializing, by the operational unit, any one operational device corresponding to the skip data among operational devices in response to the parallelization control signal;
reassigning, by the operational unit, a portion of each of the training data assigned to the other operational devices to the any one operational device; and
processing, by the operational unit, the second operation with respect to the training data in parallel using the operational devices after a predetermined time has elapsed from a time at which the first operation is performed.

2. The deep neural network training accelerator of claim 1, wherein the operational unit performs the second operation with respect to the training data after a predetermined time has elapsed from a time at which the first operation is performed.

3. The deep neural network training accelerator of claim 1, wherein the first operation is a first training stage of the mini-batch gradient descent, which uses a forward propagation algorithm.

4. The deep neural network training accelerator of claim 1, wherein the second operation is a second training stage of the mini-batch gradient descent, which sequentially uses a backward propagation algorithm and a weight update algorithm.

5. The deep neural network training accelerator of claim 1, wherein the control unit parallelizes the second operation with respect to the training data in response to the low signal.

6. The deep neural network training accelerator of claim 1, wherein a number of the low signals is inversely proportional to an operation time of the second operation.

7. The deep neural network training accelerator of claim 1, further comprising: an input unit assigning each of the input data arbitrarily selected from total input data to the operational unit; and an output unit summing each variation in weight output through the operational unit to output a variation in output weight corresponding to a gradient of the sub-set.

8. The deep neural network training accelerator of claim 1, wherein the operational unit has a systolic array structure and comprises operational devices that sequentially perform the first and second operations.

9. The deep neural network training accelerator of claim 8, wherein the operational unit initializes any one operational device corresponding to the skip data among the operational devices in response to the parallelization control signal applied thereto from the control unit.

10. The deep neural network training accelerator of claim 9, wherein the operational unit reassigns a portion of the training data assigned to the other operational devices among the operational devices to the any one operational device.

11. The deep neural network training accelerator of claim 8, wherein the control unit reassigns a plurality of sub-data divided from each of the training data to the operational devices according to a data flow.

12. The deep neural network training accelerator of claim 11, wherein the data flow refers to a data movement path for reading and storing data.

13. A method of operating a deep neural network training accelerator implemented in hardware and configured to increase learning speed and reduce learning energy, the method comprising:

performing, by an operational unit, first and second operations on a plurality of input data of a sub-set according to a mini-batch gradient descent;

determining, by a determination unit, each of the plurality of input data as one of skip data and training data based on a confidence matrix obtained by the first operation;

controlling, by a control unit, the operational unit to skip the second operation with respect to the skip data;

wherein the determination unit comprises a comparator, configured to the comparator executed by the deep neural network training accelerator to:

compare a largest element among elements of the confidence matrix with a predetermined threshold, output a low signal corresponding to the skip data to the control unit when a value of the largest element is equal to or greater than the predetermined threshold, and output a high signal corresponding to the training data to the control unit when a value of the largest element is smaller than the predetermined threshold; and output, by the control unit, a parallelization control signal to the operation unit in response to the low signal being received to control the operation unit to skip the second operation on the skip data and perform the second operation on the training data based on the parallelization control signal, wherein the performing of the second operation comprises:

initializing, by the operational unit, any one operational device corresponding to the skip data among operational devices in response to the parallelization control signal;

reassigning, by the operational unit, a portion of each of the training data assigned to the other operational devices to the any one operational device; and processing, by the operational unit, the second operation with respect to the training data in parallel using the operational devices after a predetermined time has elapsed from a time at which the first operation is performed.

14. The method of claim 13, wherein the first operation is a first training stage of the mini-batch gradient descent, which uses a forward propagation algorithm.

15. The method of claim 13, wherein the second operation is a second training stage of the mini-batch gradient descent, which sequentially uses a backward propagation algorithm and a weight update algorithm.

* * * * *